(12) United States Patent
Kurtz et al.

(10) Patent No.: US 6,988,086 B2
(45) Date of Patent: Jan. 17, 2006

(54) DOCUMENT SERVICES MANAGEMENT INCLUDING AVAILABILITY REPORTING OF DOCUMENT DISTRIBUTION SERVICES

(75) Inventors: Barry D. Kurtz, Meridian, ID (US); Larry Wayne Haley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 09/888,659

(22) Filed: Jun. 25, 2001

(65) Prior Publication Data

US 2002/0198842 A1    Dec. 26, 2002

(51) Int. Cl.
 *G06F 17/60*    (2006.01)
(52) U.S. Cl. .................. 705/51; 380/201; 380/203
(58) Field of Classification Search .................. 705/51, 705/53, 57, 59; 380/200–204
See application file for complete search history.

(56) References Cited

U.S. PATENT DOCUMENTS

| | | | |
|---|---|---|---|
| 5,467,434 A * | 11/1995 | Hower et al. .............. | 358/1.15 |
| 5,630,079 A * | 5/1997 | McLaughlin ................ | 345/734 |
| 5,970,475 A | 10/1999 | Barnes et al. | |
| 6,816,907 B1 * | 11/2004 | Mei et al. ................... | 709/229 |

FOREIGN PATENT DOCUMENTS

| JP | 02002023969 A | * | 1/2002 |
|---|---|---|---|
| WO | WO 00/03342 | | 1/2000 |

OTHER PUBLICATIONS

IBM Technical Disclosure Bulleting; Title: Collaborative Multimedia Annotation using a Centralized Document server; vol. 38; Sep. 1995.*

* cited by examiner

*Primary Examiner*—Elisca Pierre Eddy

(57) ABSTRACT

A system and method of managing document distribution services of a plurality of document distribution providers includes registering the document distribution services, identifying at least one resource for each of the document distribution services, and monitoring an availability of the at least one resource for each of the document distribution services. As such, identifying at least one resource for each of the document distribution services includes defining at least one attribute of the at least one resource and monitoring the availability of the at least one resource for each of the document distribution services includes recording a status of the at least one attribute of the at least one resource.

18 Claims, 12 Drawing Sheets

DOCUMENT SERVICES MANAGEMENT INCLUDING AVAILABILITY REPORTING OF DOCUMENT DISTRIBUTION SERVICES

CROSS-REFERENCE TO RELATED APPLICATIONS

This application is related to Non-Provisional U.S. patent application Ser. No. 09/782,765, entitled "DOCUMENT DISTRIBUTION SYSTEM AND METHOD WITH CONSOLIDATED DOCUMENT SERVICES MANAGEMENT", filed on Feb. 13, 2001, assigned to the assignee of the present invention, and incorporated herein by reference.

THE FIELD OF THE INVENTION

The present invention relates generally to document services and, more particularly, to a system and method of managing document distribution services of a plurality of document distribution providers, including reporting an availability of such services.

BACKGROUND OF THE INVENTION

Typically, a user of a personal computer has multiple services or options available to them for distributing a document from the computer. The user, for example, may print the document at a printer, send the document electronically via e-mail, or publish the document with print publishing services. To be able to utilize such services, however, the user must be aware of such services and, more importantly, a program or driver for each of the services must be installed on the computer.

Unfortunately, managing such services on a plurality of individual computers is a laborious task. Each service, for example, must be deployed, installed, configured, and maintained on each computer. Understandably, management of such services is augmented by the number of distribution services being provided as well as the number of users or computers needing access to such services. Typically, an administrator is responsible for maintaining an availability of the services for use by the users. The administrator, however, only receives information on which services have failed not necessarily which services are working or available and, more specifically, how long and/or how well the services have been working or available.

Accordingly, a need exists for managing document distribution services of a plurality of document distribution providers and, more particularly, monitoring and reporting an availability of such services.

SUMMARY OF THE INVENTION

One aspect of the present invention provides a method of managing document distribution services. The method includes registering the document distribution services, identifying at least one resource for each of the document distribution services, and monitoring an availability of the at least one resource for each of the document distribution services. As such, identifying at least one resource for each of the document distribution services includes defining at least one attribute of the at least one resource and monitoring the availability of the at least one resource for each of the document distribution services includes recording a status of the at least one attribute of the at least one resource.

Another aspect of the present invention provides a system for managing document distribution services. The system includes a document distribution system controller configured to have the document distribution services registered therewith, and an availability analysis system associated with the document distribution system controller and adapted to monitor an availability of the document distribution services. As such, the availability analysis system is adapted to record a status of at least one attribute of at least one resource for each of the document distribution services.

In one embodiment, the present invention provides a system and method of managing document distribution services of a plurality of document distribution providers, including reporting an availability of such services. As such, the system and method utilizes a communication network linking the document distribution providers and a controller of the system to efficiently monitor the document distribution services and report an availability of the services to a system administrator.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
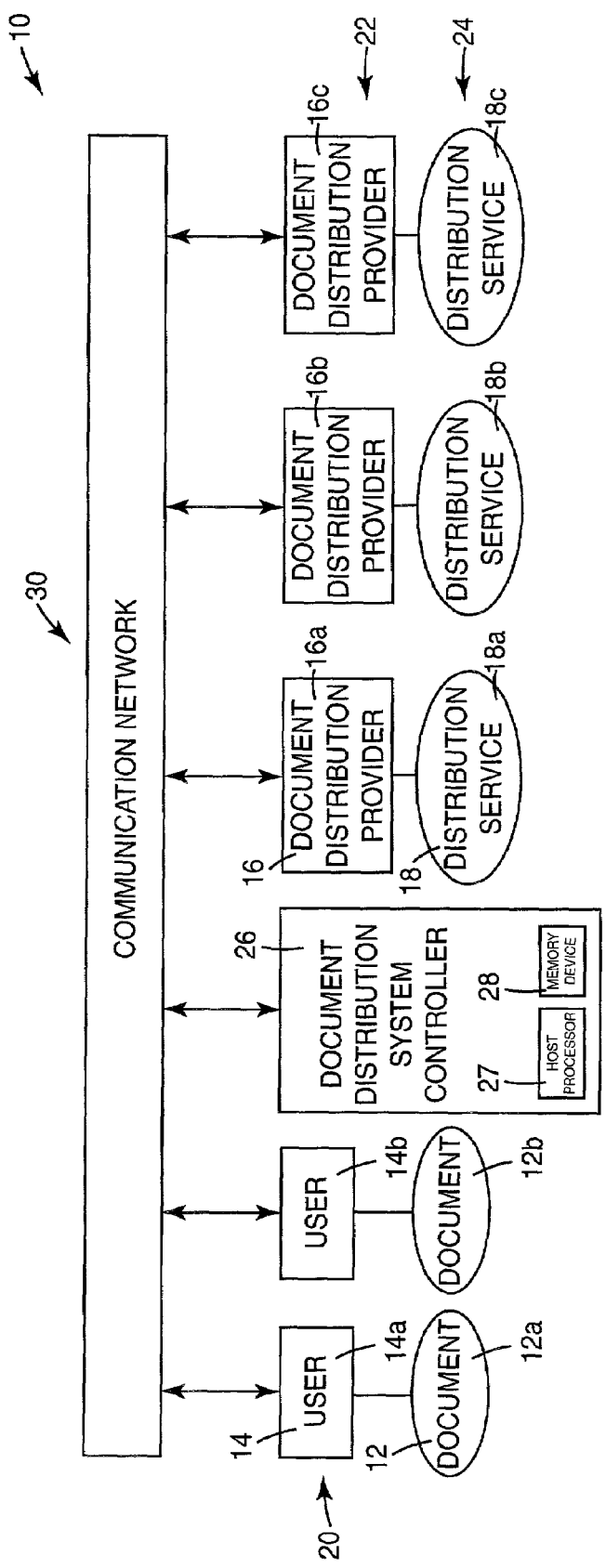
FIG. 1 is a block diagram illustrating one exemplary embodiment of a document distribution system according to the present invention.

A document distribution system according to the present invention is illustrated generally at 10 in FIG. 1. Document distribution system 10 facilitates distribution of a document 12 of a user 14 to a document distribution provider 16 offering a document distribution service 18. In particular, document distribution system 10 manages distribution of a document 12a, 12b of a respective user 14a, 14b to at least one document distribution provider 16a, 16b, 16c offering a document distribution service 18a, 18b, 18c, respectively. For clarity, document 12a, 12b, user 14a, 14b, document distribution provider 16a, 16b, 16c, and document distribution service 18a, 18b, 18c are referred to hereinafter as document 12, user 14, document distribution provider 16, and document distribution service 18, respectively.

User 14 may be one of a plurality of users 20 each having a respective document 12. Document distribution provider 16 may be one of a plurality of document distribution providers 22 collectively providing document distribution services 24. As such, document distribution system 10 manages document distribution services 24 of document distribution providers 22 and routes documents 12 of users 20 to document distribution providers 22 for distribution via document distribution services 24, as described below.

Document 12, as used herein, is defined to include any information presented in textual and/or graphical form. User 14, as used herein, is defined to include an entity or entities such as a consumer, an employee, or a system requesting, soliciting, and/or using distribution services for a document. Document distribution provider 16, as used herein, is defined to include an entity, device, or system offering and/or providing distribution services for a document. Document distribution service 18, as used herein, is defined to include any distribution, delivery, display, and/or dissemination services for a document such as print services, electronic mail services, and/or publishing services.

Document distribution providers 22 include hardware, software, firmware, or a combination of these. In one preferred embodiment, document distribution providers 22 include a computer server or other microprocessor based system capable of performing a sequence of logic operations. In addition, document distribution providers 22 can include a microprocessor embedded system/appliance incorporating tailored appliance hardware and/or dedicated single purpose hardware.

Document distribution system 10 includes a document distribution system controller 26 which manages and/or coordinates distribution of documents 12 to document distribution providers 22. More specifically, document distribution system controller 26 registers document distribution services 24 of document distribution providers 22, presents document distribution services 24 to users 20, and distributes documents 12 of users 20 to document distribution providers 22 offering document distribution services 24 selected by users 20, as described below. As such, document distribution system controller 26 facilitates management of document distribution services 24.

Document distribution system controller 26 includes hardware, software, firmware, or a combination of these. In one preferred embodiment, document distribution system controller 26 includes a host processor 27. Host processor 27 can be or can be included in a computer server or other microprocessor based system capable of performing a sequence of logic operations. In addition, document distribution system controller 26 can include a microprocessor embedded system/appliance incorporating tailored appliance hardware and/or dedicated single purpose hardware.

In one exemplary embodiment, document distribution system controller 26 includes a memory device 28 which stores information for document distribution system controller 26 and/or document distribution system 10. Examples of memory device 28 include non-volatile memory (e.g., a hard disk drive or other persistent storage device) and may include volatile memory (e.g., random access memory (RAM)). Another example of memory device 28 may include a relational database management server (RDBMS). While memory device 28 is presented as part of document distribution system controller 26, it is within the scope of the present invention for memory device 28 to be separate from document distribution system controller 26.

Users 20, document distribution providers 22, and document distribution system controller 26 communicate with each other via a communication network 30. More specifically, communications between users 20, and document distribution system controller 26, communications between document distribution providers 22 and document distribution system controller 26, and communications between users 20 and document distribution providers 22 are conducted over communication network 30. Communication network 30, as used herein, is defined to include a local-area network (LAN) and/or a wide-area network (WAN). Communication network 30, therefore, may include an intranet communication network, an Internet communication network, or similar high-speed communication network including a wireless communication network.

In one exemplary embodiment, users 20, document distribution providers 22, and document distribution system controller 26 are located remote from each other (i.e., at different location). Thus, communications between users 20, document distribution providers 22, and document distribution system controller 26 are conducted over communication network 30. It is, however, within the scope of the present invention for users 20, document distribution providers 22, and/or document distribution system controller 26 to be located at the same location. Thus, users 20, document distribution providers 22, and/or document distribution system controller 26 may communicate in other manners (e.g., a direct connection or communication link).

Components of document distribution system 10, including document distribution providers 22 and/or document distribution system controller 26, can be implemented in hardware via a microprocessor, programmable logic device, or state machine, in firmware, or in software within a given device. In one embodiment, at least a portion of the software programming is written in JAVA programming language, and each of the main components communicate via communication network 30 using a communication bus protocol. For example, the present invention may or may not use a TCP/IP protocol suite for data transport. Other programming languages, including scripting languages, and communication bus protocols suitable for use with document distribution system 10 will become apparent to those skilled in the art after reading the present application.

Figure 2:
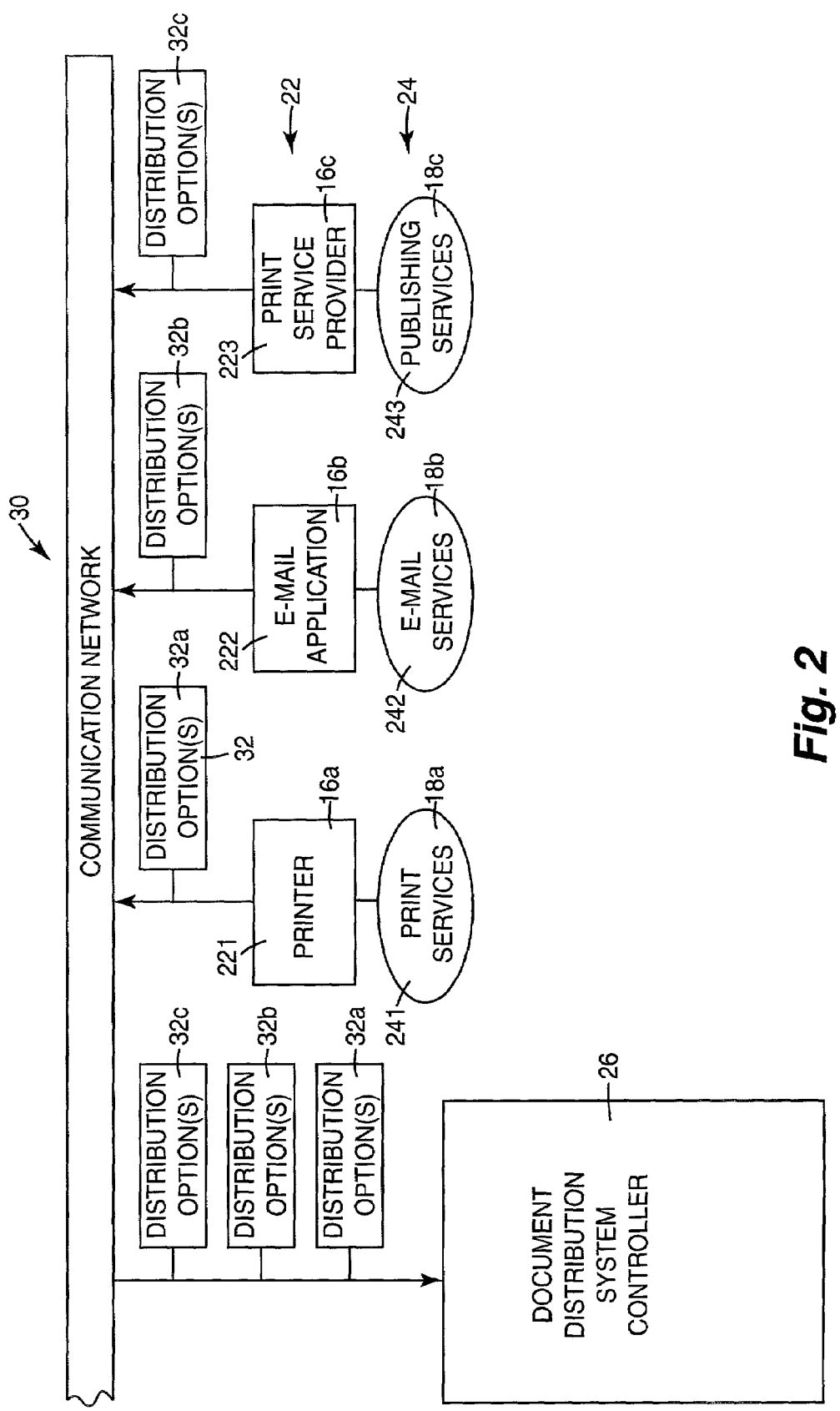
FIG. 2 is a block diagram illustrating one exemplary embodiment of information flow through a portion of the document distribution system of FIG. 1.

As illustrated in FIG. 2, document distribution providers 22 register document distribution services 24 with document distribution system controller 26 via communication network 30. More specifically, each document distribution provider 16a, 16b, 16c registers a respective document distribution option 32a, 32b, 32c representing a respective document distribution service 18a, 18b, 18c with document distribution system controller 26. For clarity, document distribution options 32a, 32b, 32c are referred to hereinafter as document distribution options 32.

In one illustrative embodiment, document distribution providers 22 include a printer 221, an electronic mail application 222, and a print service provider 223. As such, document distribution services 24 include print services 241, e-mail services 242, and publishing services 243, respectively. Printer 221, as used herein, is defined to include a printing device capable of producing printed output, including textural and/or graphical images, on a print medium, such as paper, in response to electronic signals. Examples of such a printing device include a laser printer, an inkjet printer, etc. Electronic mail application 222, as used herein, is defined to include a system for transmitting messages electronically. Print service provider 223, as used herein, is defined to include an entity, device, or system offering, providing, and/or assisting in printing services, finishing services, delivery services, including physical delivery as well as electronic delivery, and/or other print processing services.

Figure 3:
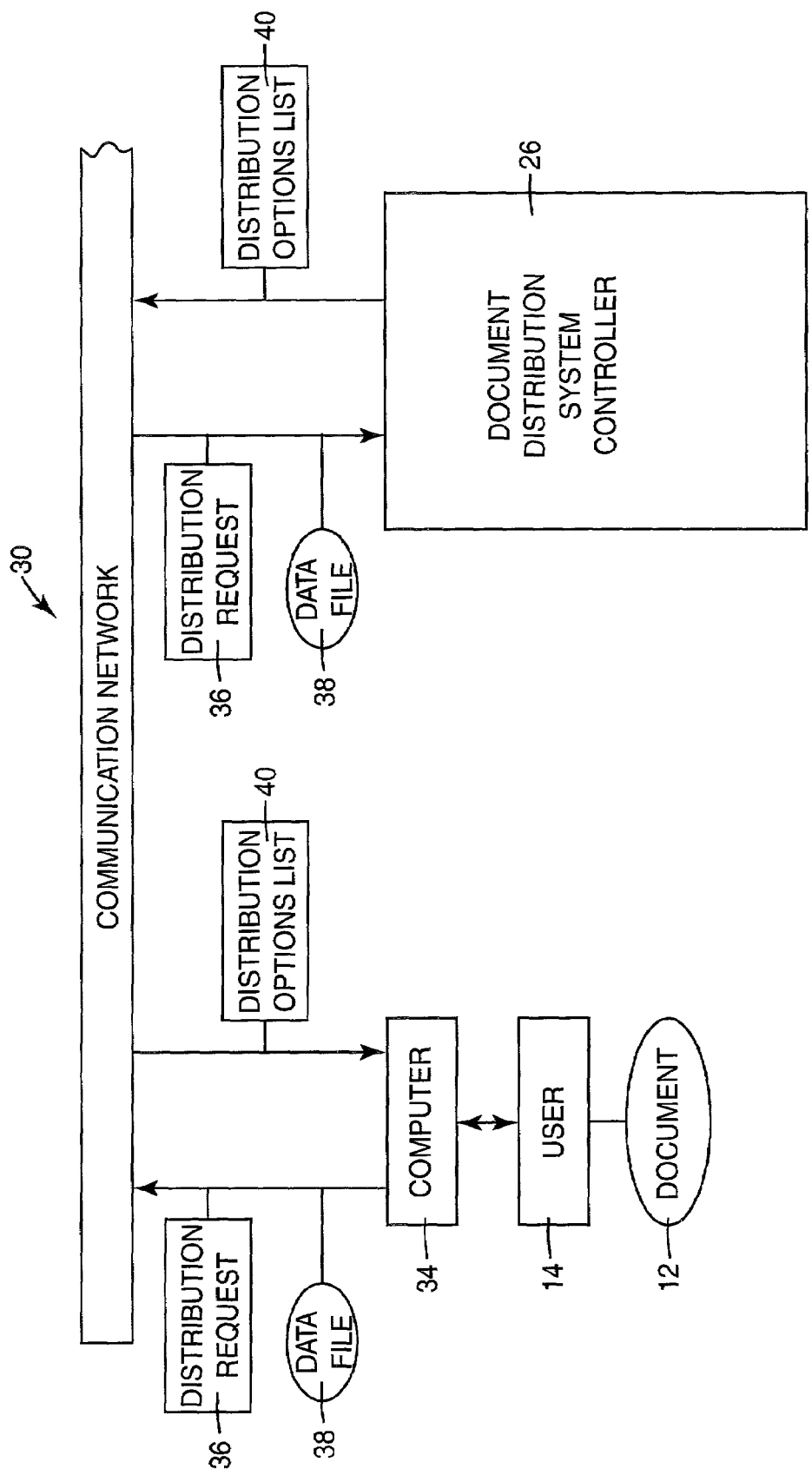
FIG. 3 is a block diagram illustrating one exemplary embodiment of information flow through another portion of the document distribution system of FIG. 1.

As illustrated in FIG. 3, user 14 interacts with a computer 34 to initiate distribution of document 12. In one exemplary embodiment, user 14 enters document distribution system 10 (FIG. 1) and, therefore, initiates distribution of document 12 by selecting "FILE/PRINT . . . " in a program or application running on computer 34 and by selecting document distribution system 10, or an application incorporating document distribution system 10, as the "NAME" of the printer. Thus, document distribution system 10 is launched by software installed on computer 34.

In one exemplary embodiment, computer 34 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system. Computer 34 may include, for example, an input device such as a keyboard and/or a mouse and a display device such as a monitor, as is well known in the art. Computer 34 may be an appliance such as a personal digital assistant (PDA), scanner, camera, cellular phone, etc.

When user 14 enters document distribution system 10, a distribution request 36 is submitted to document distribution system controller 26 via communication network 30. In addition, a data file 38 for document 12, as an electronic representation of document 12, is uploaded to document distribution system controller 26 via communication network 30. In one exemplary embodiment, document distribution system controller 26 communicates with and transfers data file 38 for document 12 to memory device 28 (FIG. 1). As such, memory device 28 stores data file 38 for document 12 for subsequent retrieval and processing, as described below.

In one exemplary embodiment, data file 38 for document 12 is converted into a standard or predetermined file format. The standard or predetermined file format is defined so as to be compatible with document distribution services 24 of document distribution providers 22. Thus, user 14 can consider all document distribution services 24 for document 12. An example of a standard or predetermined file format includes a PDF (Portable Document Format) file format.

Preferably, data file 38 is converted into a standard or predetermined file format by computer 34 before uploading to document distribution system controller 26. It is, however, within the scope of the present invention for data file 38 to be converted into a standard or predetermined file format by document distribution system controller 26 after uploading.

When distribution request 36 is submitted to document distribution system controller 26, document distribution system controller 26 compiles a list 40 of distribution options 32 for document 12. List 40 of distribution options 32 is based on document distribution services 24 as registered with document distribution system controller 26. As such, list 40 of distribution options 32 is presented to user 14 via communication network 30 and computer 34.

Figure 4:
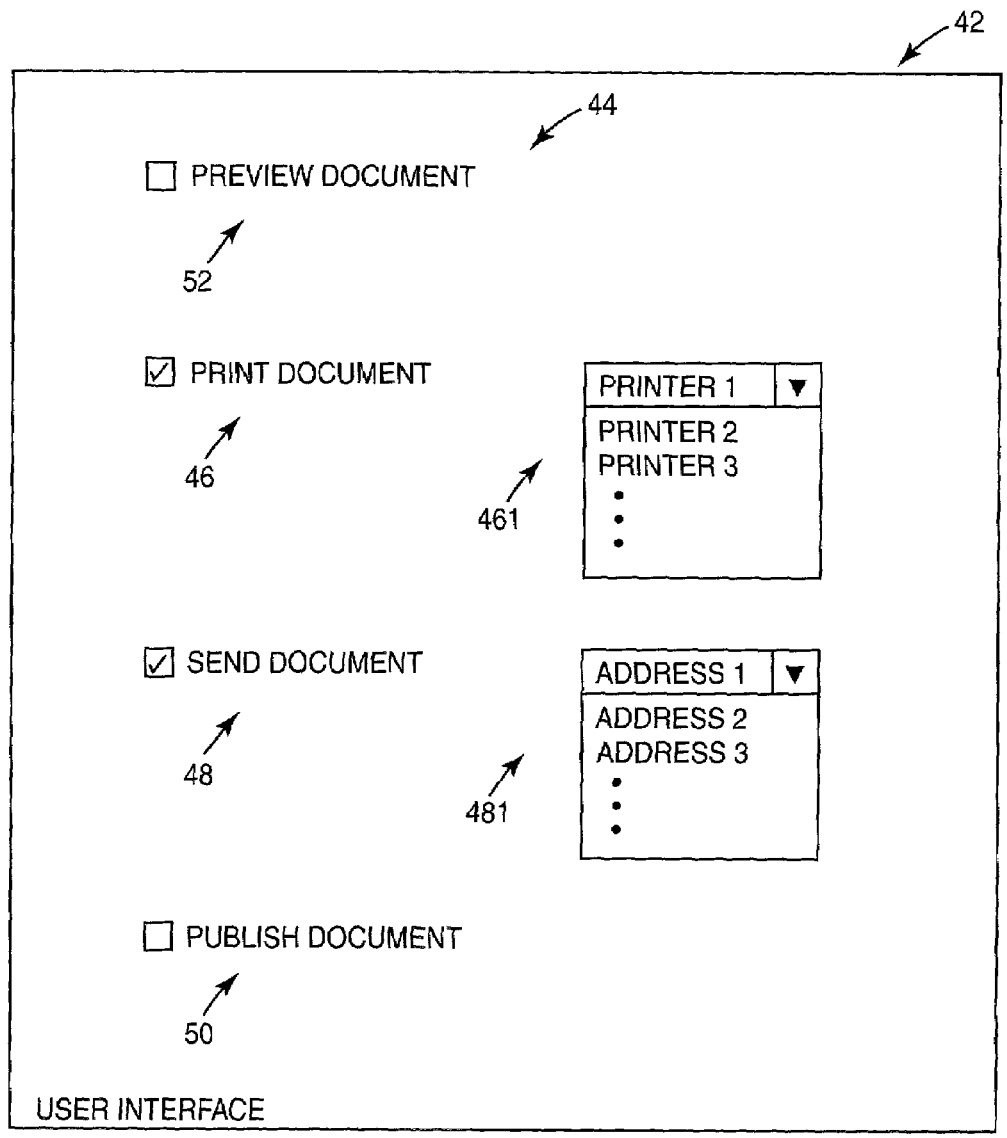
FIG. 4 is a diagram illustrating one exemplary embodiment of a user interface of the document distribution system of FIG. 1.

In one exemplary embodiment, as illustrated in FIG. 4, distribution options 32 are presented to user 14 via a user interface 42 displayed on computer 34. User interface 42 includes a plurality of input fields 44 which represent distribution options 32. As such, user 14 selects distribution options 32 for document 12 by interacting with input fields 44. Input fields 44 include, for example, a "Print Document" field 46, a "Send Document" field 48, and a "Publish Document" field 50.

Print Document field 46 represents distribution of document 12 by printing. Selection of Print Document field 46, therefore, indicates printing of document 12 with, for example, print services 241 of printer 221 (FIG. 2). In one exemplary embodiment, Print Document field 46 includes subfields 461 which represent different printers for printing of document 12.

Send Document field 48 represents distribution of document 12 via electronic mail. Selection of Send Document field 48, therefore, indicates sending of document 12 via, for example, e-mail services 242 of electronic mail application 222 (FIG. 2). In one exemplary embodiment, Send Document field 48 includes subfields 481 which represent different e-mail addresses to which document 12 can be distributed or sent.

Publish Document field 50 represents distribution of document 12 by publishing. Selection of Publish Document field 50, therefore, indicates publishing of document 12 via, for example, publishing services 243 of print service provider 223 (FIG. 2).

In one exemplary embodiment, input fields 44 include a "Preview Document" field 52. Preview Document field 52 represents distribution of document 12 by displaying of document 12 on, for example, a display device of computer 34. Thus, distribution options 32 for document 12 include, for example, previewing of document 12, printing of document 12, sending of document 12, and/or publishing of document 12. It is understood that one or more distribution options 32 may be selected and/or specified for document 12.

It is to be understood that FIG. 4 is a simplified illustration of one exemplary embodiment of user interface 42. The illustrative presentation of input fields 44 including the respective subfields, for example, has been simplified for clarity of the invention. Input fields 44, including the respective subfields, may be presented, for example, as open fields, pull-down menus, toggle selections, and/or highlighted or framed selections. In addition, user interface 42 may be presented, for example, in one or more screens or views.

Figure 5:
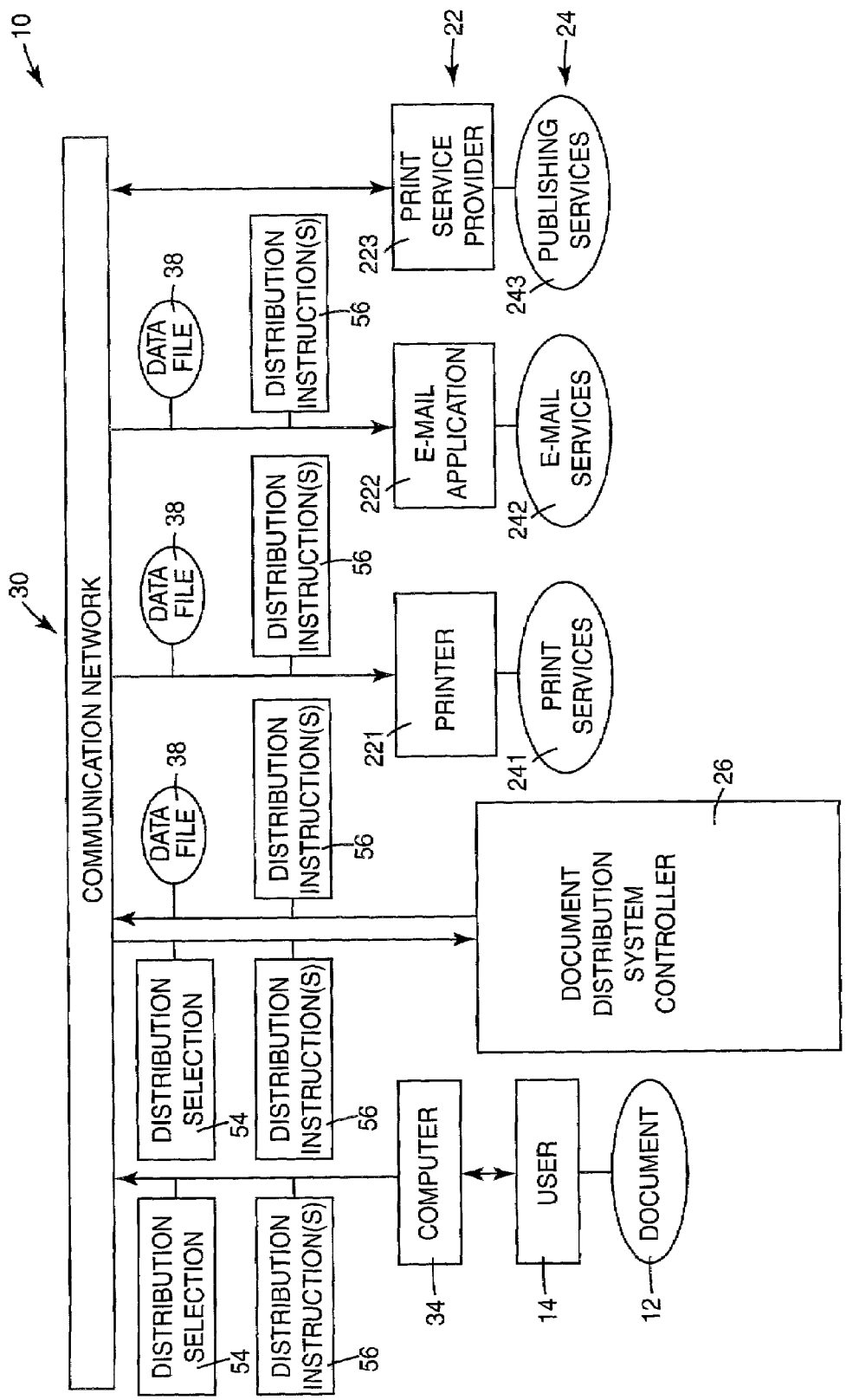
FIG. 5 is a block diagram illustrating one exemplary embodiment of information flow through the document distribution system of FIG. 1.

As illustrated in FIG. 5, user 14 submits a distribution selection 54 for document 12 to document distribution system controller 26 via communication network 30. Distribution selection 54 represents a selection of distribution options 32 from user interface 42. As such, distribution selection 54 identifies one or more distribution options 32 for document 12. Thus, document distribution system controller 26 routes or distributes data file 38 for document 12 to one or more document distribution providers 22. Document distribution system controller 26 routes data file 38 to document distribution providers 22 offering document distribution services 24 which fulfill distribution options 32 selected by user 14. In one exemplary embodiment, data file 38 is routed to document distribution providers 22 via communication network 30.

In one exemplary embodiment, user 14 also submits a distribution instruction 56 to document distribution system controller 26 via communication network 30. Distribution instruction 56 includes one or more instructions for distribution of document 12 by document distribution providers 22. Thus, distribution instruction 56 includes one or more instructions relevant to document distribution services 24 which fulfill distribution options 32 selected by user 14.

For example, if user 14 selects printing of document 12, distribution instruction 56 may include properties and/or options for print services 241 of printer 221 such as number of copies, print medium size/type, printing quality/resolution, printing layout/orientation, color printing, etc. For example, if user 14 selects sending of document 12, distribution instruction 56 may include properties and/or options for e-mail services 242 of electronic mail application 222 such as classification, priority, reply request, delivery date, return notification, password protection, etc. For example, if user 14 selects publishing of document 12, distribution instruction 56 may include properties and/or options for publishing services 243 of print service provider 223 such as number of copies, print medium size/type/color, printing quality/resolution, printing layout/orientation, color printing, finishing/binding, etc.

After receiving data file 38, document distribution providers 22 distribute document 12 accordingly. For example, if user 14 selects printing of document 12, document distribution system controller 26 routes data file 38 to printer 221 which prints document 12 with print services 241. For example, if user 14 selects sending of document 12, document distribution system controller 26 routes data file 38 to electronic mail application 222 which sends document 12 with e-mail services 242. In addition, if user 14 submits distribution instruction 56, document distribution providers 22 distribute document 12 in accordance with distribution instruction 56, as described above.

Figure 6:
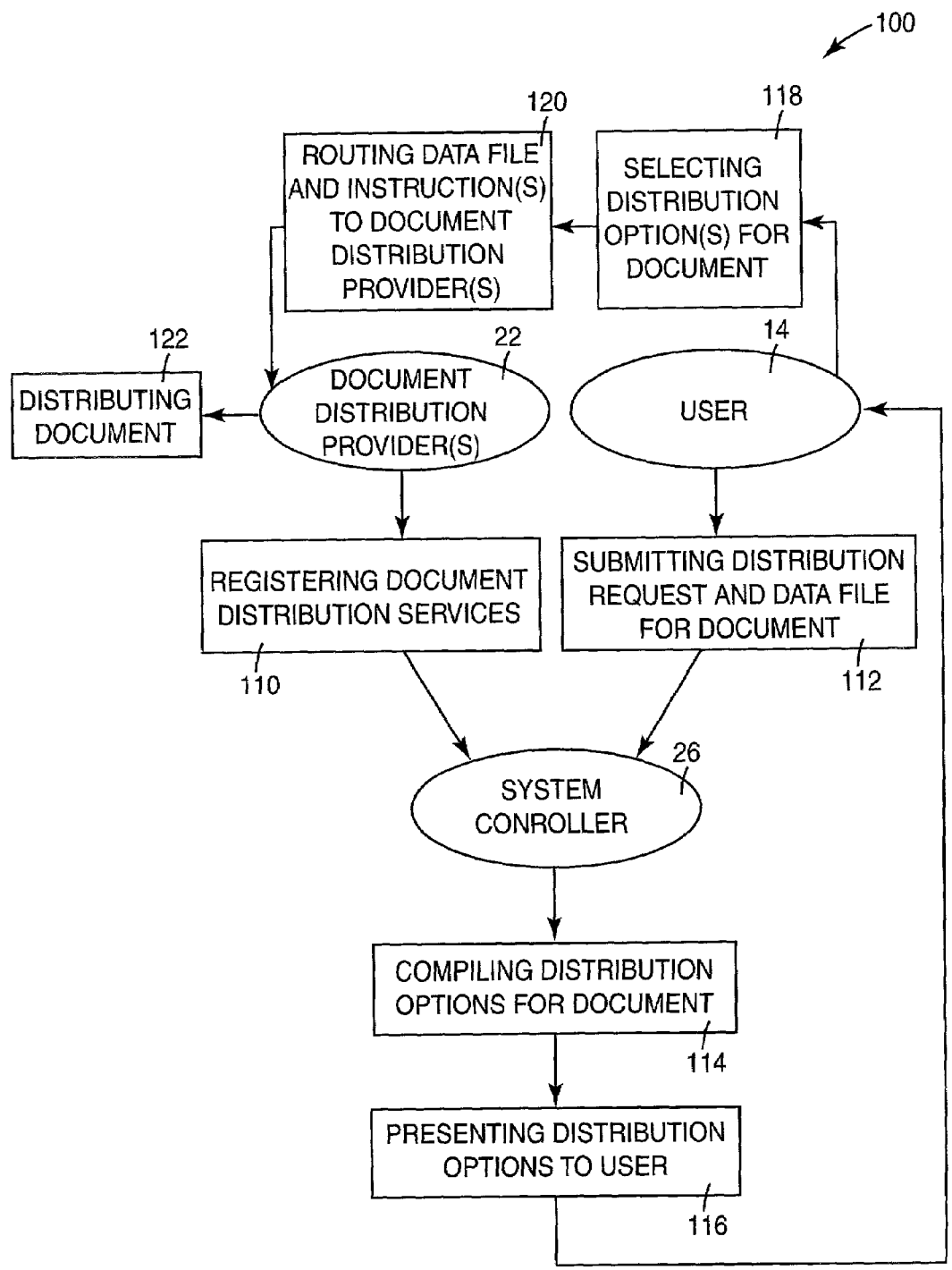
FIG. 6 is a flow diagram illustrating one exemplary embodiment of a method of distributing a document according to the present invention.

In FIG. 6, a flow diagram illustrating one exemplary embodiment of a method of distributing document 12 according to the present invention is illustrated generally at 100. Reference is also made to FIGS. 1–5. At step 110, document distribution services 24 of respective document distribution providers 22 are registered with document distribution system controller 26. More specifically, distribution options 32 of document distribution services 24 are registered with document distribution system controller 26 via communication network 30, as illustrated in FIG. 2. In one illustrative embodiment, step 110 includes registration of print services 241, e-mail services 242, and publishing services 243 of printer 221, electronic mail application 222, and print service provider 223, respectively.

At step 112, user 14 submits distribution request 36 and data file 38 for document 12 to document distribution system controller 26. In one exemplary embodiment, user 14 submits distribution request 36 and uploads data file 38 to document distribution system controller 26 via communication network 30, as illustrated in FIG. 3.

Preferably, document distribution services 24 of document distribution providers 22 are registered at step 110 before user 14 submits distribution request 36 and/or data file 38 at step 112. It is, however, within the scope of the present invention for document distribution services 24 to be re-registered and/or updated if, for example, document distribution services 24 are added, deleted, and/or modified. As such, document distribution services 24 can be managed or maintained at document distribution system controller 26.

Next, in step 114, after document distribution system controller 26 receives distribution request 36, document distribution system controller 26 determines which distribution options 32 are available for document 12. Distribution options 32 are based on document distribution services 24 registered with document distribution system controller 26 in step 110. As such, document distribution system controller 26 compiles list 40 of distribution options 32 for user 14.

Next, in step 116, distribution options 32, as determined in step 114 and compiled in list 40, are presented to user 14. In one exemplary embodiment, distribution options 32 are presented to user 14 via communication network 30 and computer 34, as illustrated in FIG. 3. As such, distribution options 32 are represented on user interface 42, as illustrated in FIG. 4.

Next, in step 118, user 14 selects one or more distribution options 32 for document 12. In one exemplary embodiment, distribution options 32 are selected by interacting with user interface 42. Thus, distribution selection 54 is conveyed to document distribution system controller 26, as illustrated in FIG. 5. In addition, selecting distribution options 32 in step 118 may also include submitting distribution instruction 56 for document 12, as described above.

Next, in step 120, document distribution system controller 26 routes or distributes data file 38 and, if submitted, distribution instruction 56 for document 12 to one or more document distribution providers 22. Document distribution system controller 26 routes data file 38 and distribution instruction 56 to document distribution providers 22 offering document distribution services 24 which fulfill distribution options 32 selected by user 14 in step 118. Thereafter, in step 122, document distribution providers 22 distribute document 12 in accordance with distribution options 32 selected by user 14 in step 118 and distribution instruction 56 submitted by user 14.

In one exemplary embodiment, data file 38 and distribution instruction 56 are routed to document distribution providers 22 via communication network 30, as illustrated in FIG. 5. In addition, when data file 38 for document 12 is uploaded to document distribution system controller 26 in step 112, document distribution system controller 26 stores data file 38 in memory device 28, as described above. Thus, document distribution system controller 26 retrieves data file 38 from memory device 28 to distribute data file 38 in step 120.

Document Services Management

Figure 7:
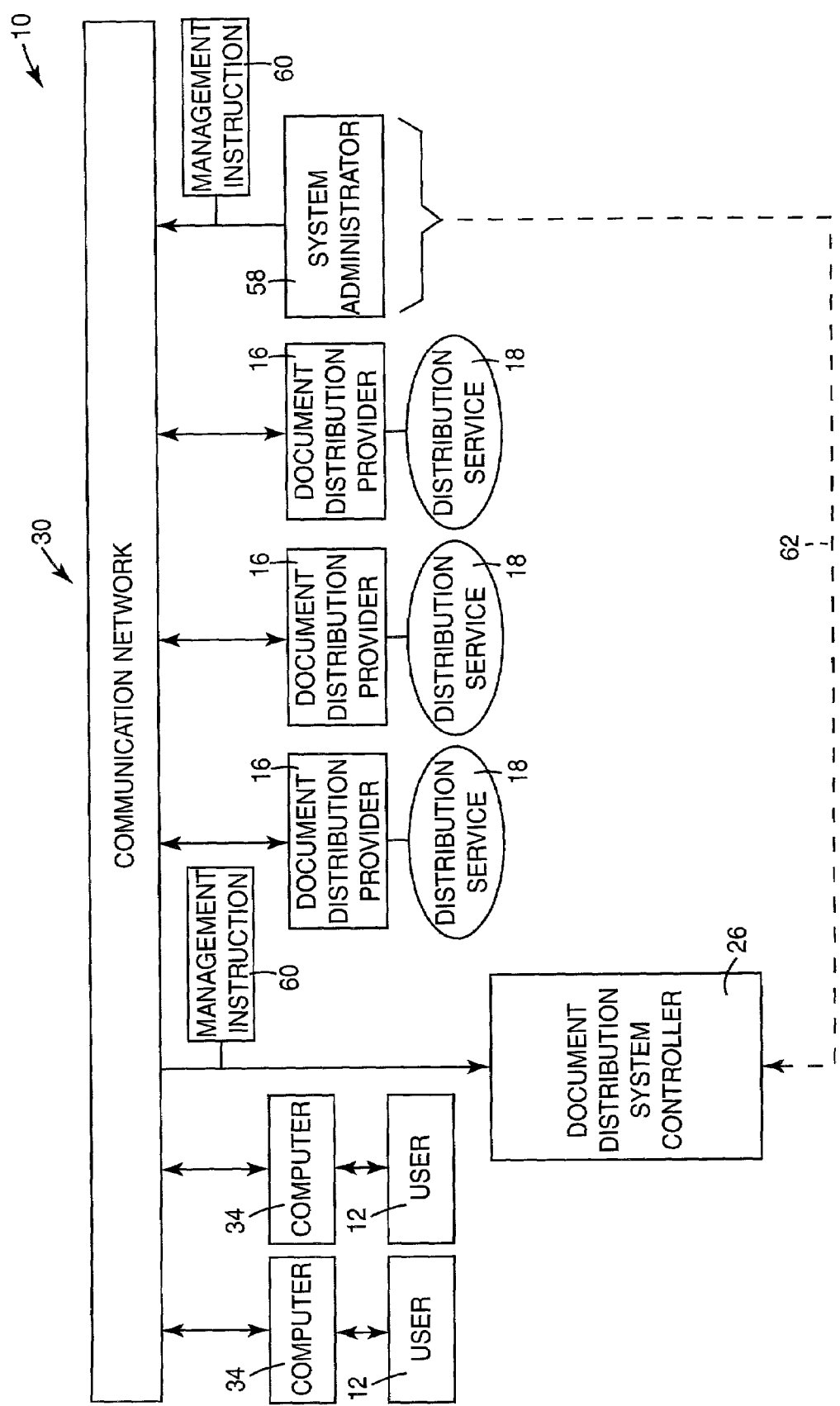
FIG. 7 is a block diagram illustrating one exemplary embodiment of document services management of the document distribution system of FIG. 1.

In one exemplary embodiment, as illustrated in FIG. 7, document distribution system 10 includes a system administrator 58 which manages document distribution system 10. More specifically, system administrator 58 manages document distribution services 24 of document distribution providers 22 registered with document distribution system controller 26. Thus, system administrator 58 interacts with document distribution system controller 26 and/or document distribution providers 22 to deploy, install, configure, and/or maintain document distribution services 24.

To manage document distribution services 24, system administrator 58 submits a management instruction 60 to document distribution system controller 26. Management instruction 60 includes one or more instructions for management of document distribution services 24. Thus, management instruction 60 includes, for example, deployment, installation, configuration, and/or maintenance information, commands, inquires, etc. Preferably, system administrator 58 interacts with and submits management instruction 60 to document distribution system controller 26 via communication network 30. It is, however, within the scope of the present invention for system administrator 58 to directly interact with document distribution system controller 26 as represented by dashed line 62.

In one exemplary embodiment, document distribution system administrator 58 includes hardware, software, firmware, or a combination of these. As such, document distribution system administrator 58 can include a computer server or other microprocessor based system capable of performing a sequence of logic operations, including management of document distribution services 24.

With document distribution services 24 of document distribution providers 22 registered with document distribution system controller 26, document distribution system 10 facilitates management of document distribution services 24. More specifically, since document distribution services 24 are registered with document distribution system controller 26, document distribution services 24 can be centrally-managed at document distribution system controller 26. As such, it is not necessary to install and maintain document distribution services 24 of document distribution providers 22 at computer 34 for user 14. Thus, management of document distribution services 24, including, for example, deployment, installation, configuration, and/or maintenance, is consolidated.

Since document distribution services 24 are registered with document distribution system controller 26, document distribution services 24 can be managed and made available to user 14 without affecting a configuration of computer 34. For example, new document distribution services 24 can be registered with document distribution system controller 26 and, therefore, added to document distribution system 10 without having to deploy and install document distribution services 24 on computer 34. Thus, new document distribution services 24 can be made available to user 14 without changing the configuration of computer 34.

Figure 8:
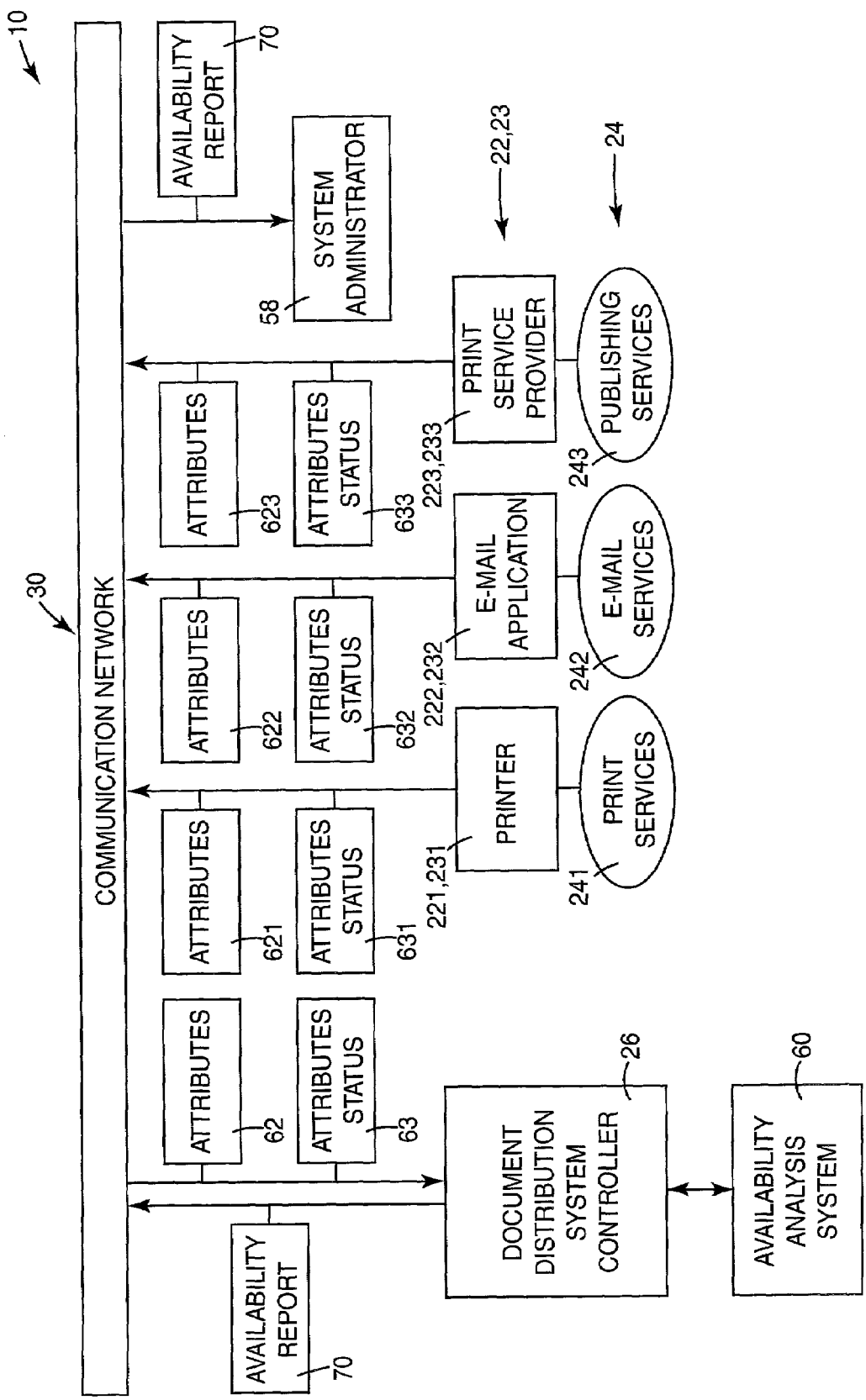
FIG. 8 is a block diagram illustrating another exemplary embodiment of document services management of the document distribution system of FIG. 1.

In one exemplary embodiment, as illustrated in FIG. 8, document distribution system 10 includes an availability analysis system 60 which facilitates management of document distribution services 24. More specifically, availability analysis system 60 analyzes an availability of document distribution services 24 and reports the availability of such services, as described in detail below. Availability analysis system 60 communicates with document distribution system controller 26 and includes hardware, software, firmware, or a combination of these. As such, availability analysis system 60 can include a computer server or other microprocessor-based system capable of performing a sequence of logic operations, including management of document distribution services 24. While availability analysis system 60 is illustrated as being separate from document distribution system controller 26, it is within the scope of the present invention for availability analysis system 60 to be a part of document distribution system controller 26.

Document distribution providers 22 constitute document distribution resources 23 which provide document distribution services 24. For example, printer 221 constitutes a document distribution resource 231 which provides print services 241, electronic mail application 222 constitutes a document distribution resource 232 which provides e-mail services 242, and print service provider 223 constitutes a document distribution resource 233 which provides publishing services 243. It is understood that document distribution system 10 may include more than one printer 221, more than one electronic mail application 222, and/or more than one print service provider 223 which constitute respective document distribution resources 23.

To facilitate an analysis of the availability of document distribution resources 23, one or more attributes 62 of respective document distribution resources 23 are defined and an attributes status 63 of attributes 62 is monitored. Attributes status 63 of attributes 62 may be monitored, for example, at predetermined intervals of time.

Attributes 62 and attributes status 63 of attributes 62 define resource events of document distribution resources 23 which are monitored and analyzed by availability analysis system 60. Preferably, attributes 62 specify characteristics or features of respective document distribution resources 23 which control and/or affect an availability of document distribution resources 23, including an ability of document distribution resources 23 to provide respective document distribution services 24. As such, attributes status 63 identify a status of respective attributes 62 and are indicative of an availability of document distribution resources 23 and, therefore, document distribution services 24.

As illustrated in FIG. 8, attributes 62 and attributes status 63 of document distribution resources 23 are recorded or registered with document distribution system controller 26. In one exemplary embodiment, attributes 62 and attributes status 63 of respective document distribution resources 23 are registered with and/or submitted to document distribution system controller 26 via communication network 30. Since availability analysis system 60 communicates with or is a part of document distribution system controller 26, availability analysis system 60 receives registration of document distribution services 24 as well as attributes 62 and attributes status 63 of document distribution resources 23.

Figure 9:
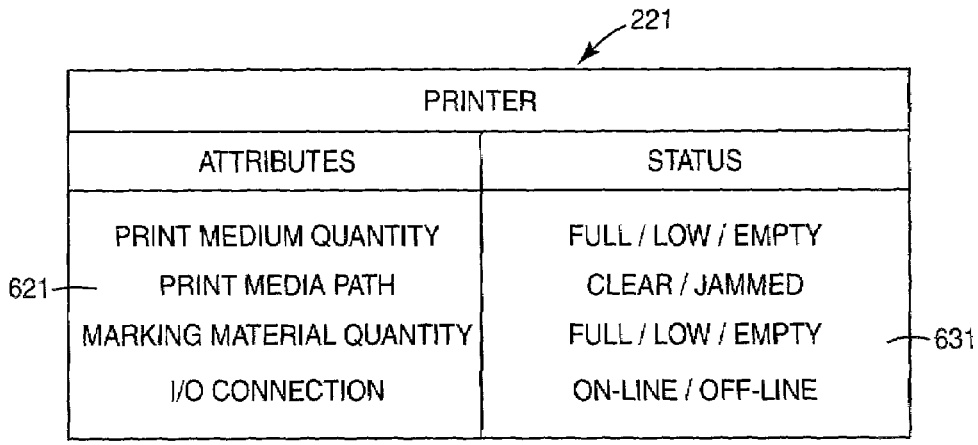
FIG. 9 is a diagram illustrating one exemplary embodiment of printer events monitored according to the present invention.
Figure 10:
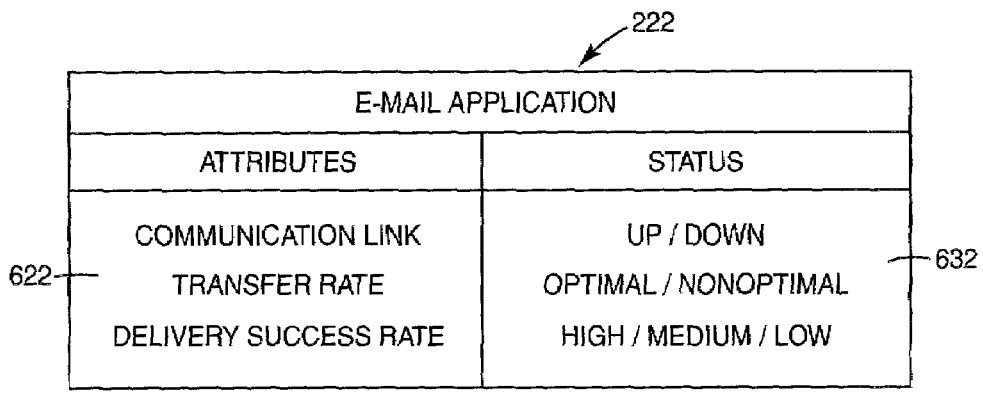
FIG. 10 is a diagram illustrating one exemplary embodiment of electronic mail application events monitored according to the present invention.
Figure 11:
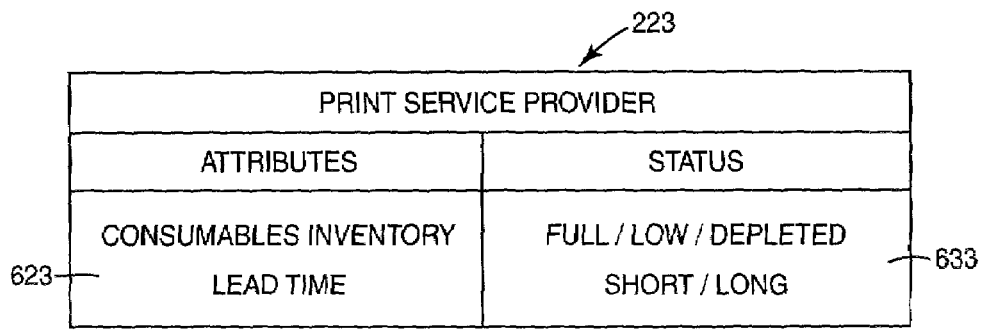
FIG. 11 is a diagram illustrating one exemplary embodiment of print service provider events monitored according to the present invention.

FIGS. 9–11 illustrate attributes 62 and attributes status 63 for printer 221, electronic mail application 222, and print service provider 223. Attributes 62 include, for example, electrical, mechanical, and/or consumables attributes of printer 221, electronic mail application 222, and print service provider 223. As illustrated in FIG. 9, printer 221, as document distribution system resource 231, includes attributes 621 which are monitored by respective attributes status 631. Attributes 621 of printer 221 and respective attributes status 631 of attributes 621 include, for example, a print medium quantity attribute having a status which is indicated as being "Full", "Low", or "Empty", a print media path attribute having a status which is indicated as being "Clear" or "Jammed", a marking material quantity attribute, such as ink or toner, having a status which is indicated as being "Full", "Low", or "Empty", and an input/output connection attribute having a status which is indicated as being "On-Line" or "Off-Line".

As illustrated in FIG. 10, electronic mail application 222, as document distribution resource 232, includes attributes 622 which are monitored by respective attributes status 632.

Attributes 622 of electronic mail application 222 and respective attributes status 632 of attributes 622 include, for example, a communication link attribute having a status which is indicated as being "Up" or "Down", a transfer rate attribute having a status which is indicated as being "Optimal" or "Nonoptimal", as measured, for example, in bytes-per-second, and a delivery success rate attribute having a status which is indicated as being "High", "Medium", or "Low". As such, the communication link attribute measures a connectivity or operation of electronic mail application 222 and the transfer rate attribute measures a throughput and/or speed of electronic mail application 222 as well as a number of messages sent via electronic mail application 222. The delivery success rate attribute is based, for example, on a ratio of successful deliveries to delivery attempts of electronic mail application 222. Delivery failures, therefore, may be derived based on a ratio of failed deliveries to delivery attempts of electronic mail application 222. In addition, delivery retries as well as communication failures of electronic mail application 222 may be measured.

As illustrated in FIG. 11, print service provider 223, as document distribution resource 233, includes attributes 623 which are monitored by respective attributes status 633. Attributes 623 of print service provider 223 and respective attributes status 633 of attributes 623 include, for example, a consumables inventory attribute, such as print medium supply, ink or toner supply, and/or cover and binding supplies, having a status which is indicated as being "Full", "Low", or "Depleted" and a lead time attribute having a status which is indicated as being "Short" or "Long", as measured, for example, in hours or days. As such, the lead time attribute measures a turnaround time of document distribution with print service provider 223. The lead time attribute is based, for example, on an availability or load as well as an operational status of equipment providing the services of print service provider 223.

Figure 12:
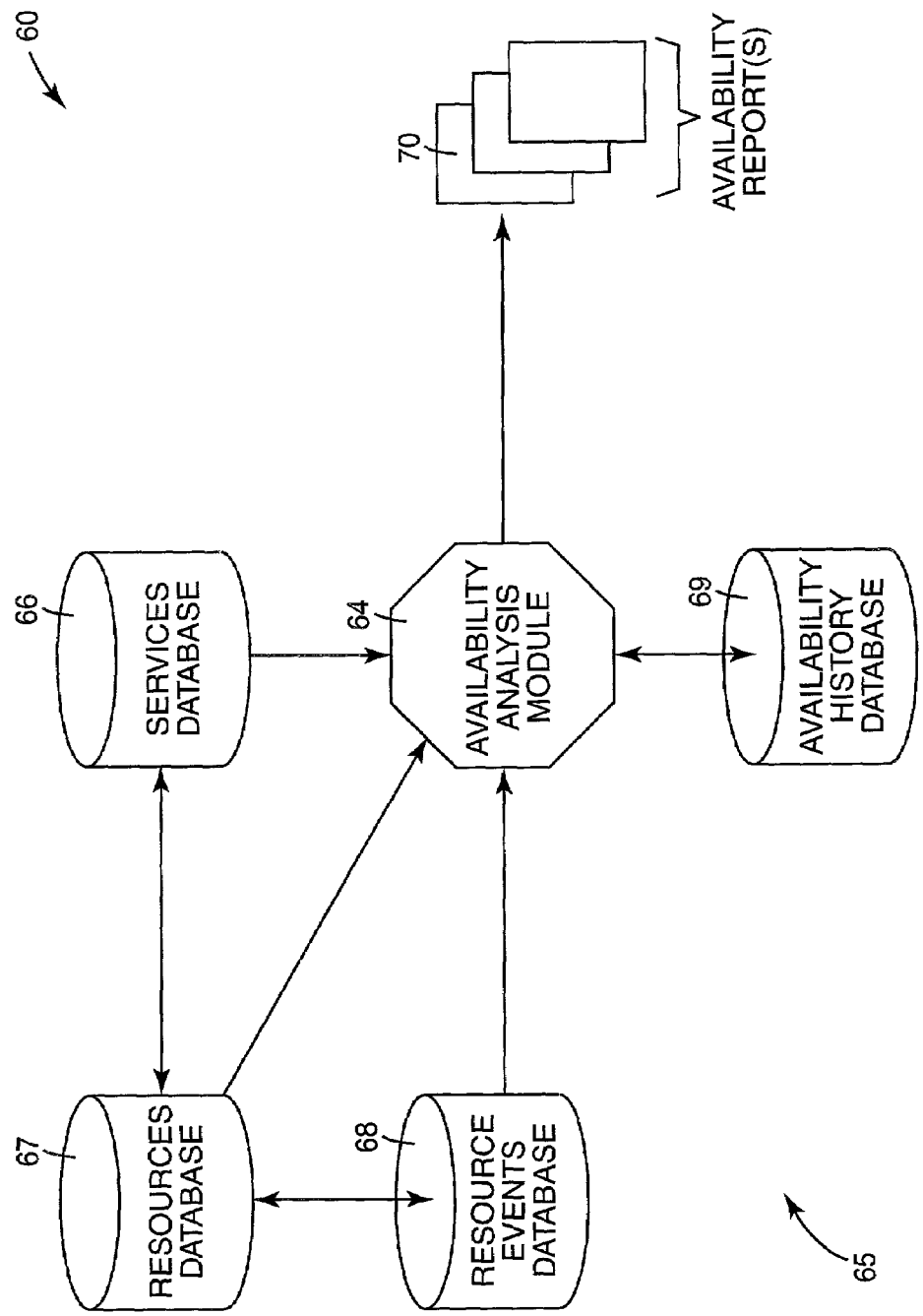
FIG. 12 is a block diagram illustrating one exemplary embodiment of an availability analysis system of the document distribution system of FIG. 8.

In one exemplary embodiment, as illustrated in FIG. 12, availability analysis system 60 includes an availability analysis module 64 and a data storage system 65. Availability analysis module 64 includes hardware, software, firmware, or a combination of these. As such, availability analysis module 64 can include a computer server or other microprocessor-based system capable of performing a sequence of logic operations, including analyzing an availability of document distribution services 24. Examples of data storage system 65 include non-volatile memory (e.g., a hard disk drive or other persistent storage device) and may include volatile memory (e.g., random access memory (RAM)). Another example of data storage system 65 may include a relational database management server (RDBMS).

Data storage system 65 includes a document distribution services database 66 which stores registration of document distribution services 24, a document distribution resources database 67 which stores identification of document distribution resources 23, and a resource events database 68 which stores attributes status 63 of respective attributes 62 of document distribution resources 23. As such, availability analysis module 64 receives or retrieves input from document distribution services database 66, document distribution resources database 67, and resource events database 68 and analyzes an availability of document distribution services 24 based on attributes status 63 of respective attributes 62 of document distribution resources 23. In addition, availability analysis system 60 includes an availability history database 69 which stores availability analysis of document distribution services 24 as analyzed by availability analysis module 64.

Based on the availability of document distribution services 24 and, more specifically, document distribution resources 23, availability analysis module 64 generates one or more availability reports 70. As such, availability analysis module 64 distributes availability reports 70 to system administrator 58. In one exemplary embodiment, availability reports 70 are distributed to system administrator 58 via document distribution system controller 26 and communication network 30.

In one exemplary embodiment, availability reports 70 include real-time reports and/or historical reports of an availability of document distribution services 24 and, more specifically, document distribution resources 23. Thus, availability reports 70 may be generated based on historical analysis of the availability of document distribution services 24 as stored and retrieved from availability history database 69. Availability reports 70, therefore, identify which document distribution resources 23 and, therefore, which document distribution services 24 of document distribution system 10 are and/or have been available to users 14.

Figure 13:
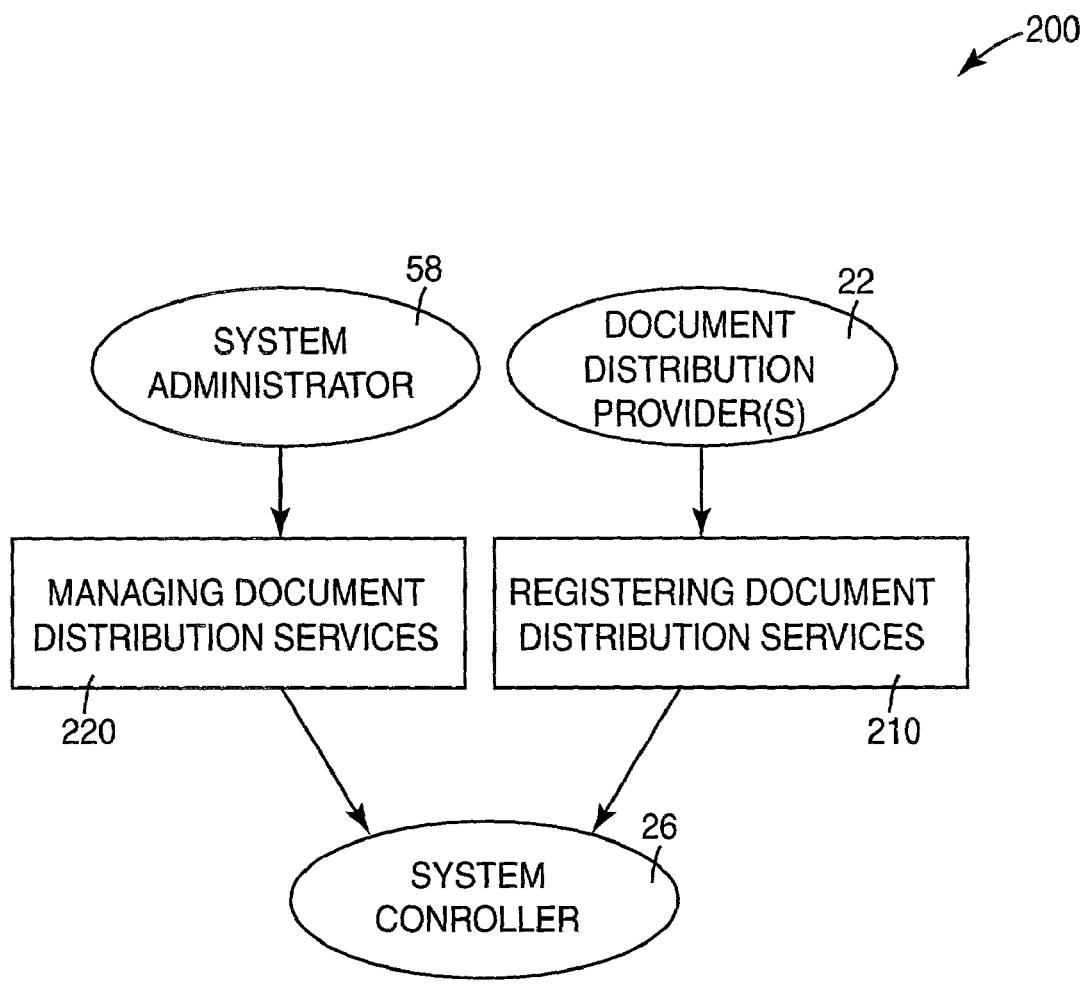
FIG. 13 is a flow diagram illustrating one exemplary embodiment of a method of managing document distribution services according to the present invention.

In FIG. 13, a flow diagram illustrating one exemplary embodiment of a method of managing document distribution services 24 according to the present invention is illustrated generally at 200. Reference is also made to FIGS. 1–12. At step 210, document distribution services 24 of respective document distribution providers 22 are registered with document distribution system controller 26, in a manner similar to that described above in step 110. Thus, at step 220, system administrator 58 manages document distribution services 24 of document distribution providers 22. More specifically, system administrator 58 manages document distribution services 24 at document distribution system controller 26, as described above. Thus, it is not necessary for system administrator 58 to deploy, install, configure, and/or maintain document distribution services 24 of document distribution providers 22 at each computer 34.

Figure 14:
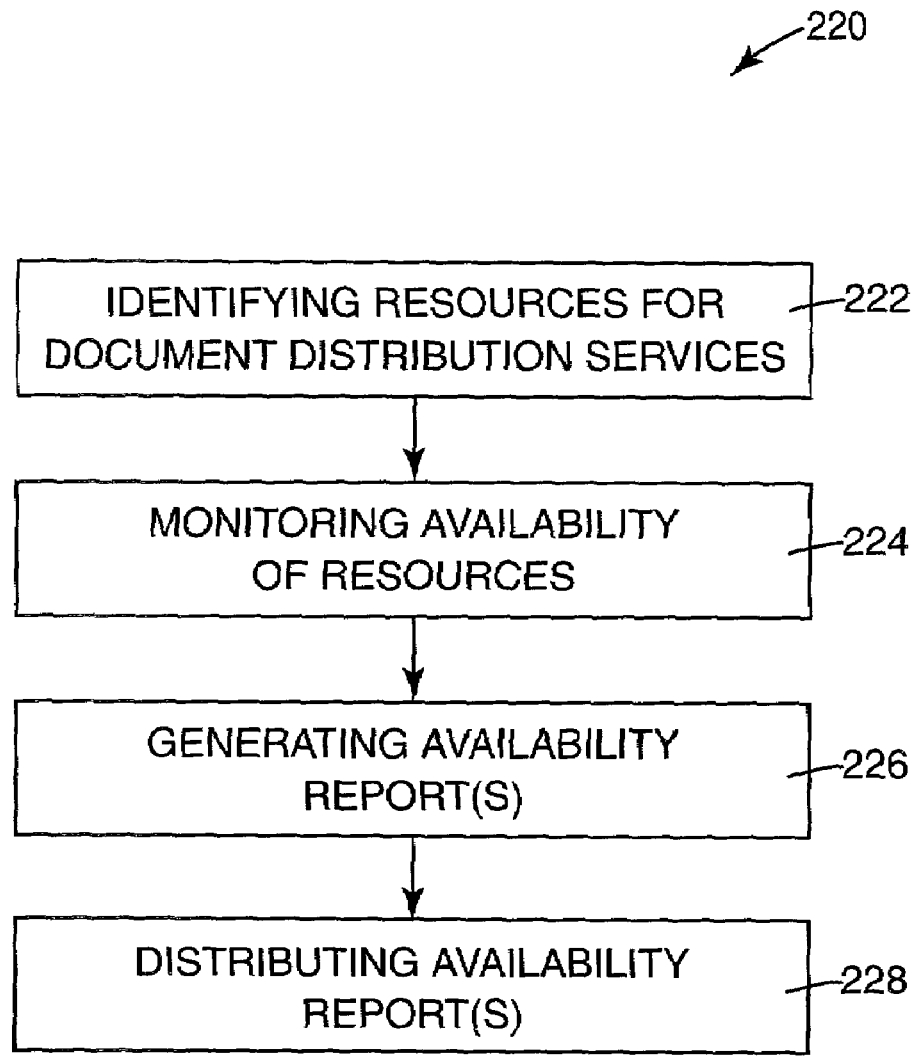
FIG. 14 is a flow diagram illustrating one exemplary embodiment of a method of reporting availability of document distribution services in the method of FIG. 13.

In one exemplary embodiment, as illustrated in FIG. 14, managing document services 24 in step 220 includes identifying one or more document distribution resources 23 for document distribution services 24, as indicated in step 222, and monitoring an availability of document distribution resources 23 for document distribution services 24, as indicated in step 224. As such, one or more availability reports 70 for document distribution resources 23 and, therefore, document distribution services 24 are generated in step 226 by availability analysis system 60 and, more specifically, availability analysis module 64 based on the availability of document distribution resources 23 as monitored in step 224. Thereafter, availability reports 70 are distributed in step 228. Availability reports 70 are distributed, for example, to system administrator 58 via document distribution system controller 26 and communication network 30, as illustrated in FIG. 8.

Preferably, identifying document distribution resources 23 for document distribution services 24 in step 222 includes defining attributes 62 of respective document distribution resources 23. As such, monitoring availability of document distribution resources 23 for document distribution services 24 in step 224 includes recording attributes status 63 of attributes 62, as described above. In addition, generating availability reports 70 for document distribution resources 23 in step 226 includes compiling or analyzing attributes status 63 of attributes 62 for respective document distribution resources 23.

In one exemplary embodiment, steps 110-122 of method 100 and/or steps 210 and 220 of method 200, including steps 222-228, are performed via computer-executable instructions of a computer-readable medium. Computer-readable medium, as used herein, is defined to include any kind of computer memory such as a floppy disk, conventional hard disk, CD-ROM, Flash ROM, nonvolatile ROM, RAM, etc.

By having document distribution services 24 of document distribution providers 22 registered with document distribution system controller 26, document distribution system 10 provides a consolidated system for accessing as well as managing document distribution services 24. More specifically, document distribution system 10 presents user 14 with a plurality of document distribution services 24 and, therefore, a plurality of distribution options 32 for document 12. As such, user 14 can specify one or more distribution options 32 for document 12 by accessing one system. Document 12, therefore, can be simultaneously distributed with multiple services. Thus, it is not necessary for user 14 to access multiple systems to distribute document 12.

In addition, by having document distribution services 24 of document distribution providers 22 registered with document distribution system controller 26, system administrator 58 can manage document distribution services 24 centrally at document distribution system controller 26 rather than individually at each computer 34. Thus, management of document distribution services 24, including, for example, deployment, installation, configuration, and/or maintenance, is simplified.

Furthermore, by providing document distribution system 10 with availability analysis system 60, an availability of document distribution services 24 can be monitored and availability reports 70 of such availability can be generated. As such, which document distribution services 24 are working and/or available, including, for example, how long and/or how well document distribution services 24 have been working and/or available can reported. Thus, system administrator 58, for example, can review real-time as well as historical analysis of the availability of document distribution services 24, including the availability of document distribution resources 23 providing document distribution services 24. Accordingly, proactive measures can be taken to ensure the availability of document distribution services 24 to users 14.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method comprising:
registering document distribution services of a plurality of document distribution providers, the document distribution services including print services, electronic mail services, and publishing services;
identifying at least one resource of the document distribution providers for performing each of the document distribution services, including defining at least one attribute of the at least one resource;
distributing documents with the document distribution services, including receiving and processing document distribution requests each specifying at least one of the document distribution services; and
monitoring an availability of the at least one resource for each of the document distribution services, including recording a real-time status and a historical status of the at least one attribute of the at least one resource,
wherein identifying the at least one resource includes identifying at least one printer which provides the print services, wherein defining the at least one attribute includes defining at least one printer attribute of the at least one printer, and wherein recording the real-time status and the historical status includes recording at least one of a quantity level of print medium, a status of a print media path, a quantity level of marking material, and a status of an input/output connection of the at least one printer.

2. The method of claim 1, wherein identifying at least one resource for performing each of the document distribution services includes identifying at least one electronic mail application which provides the electronic mail services.

3. The method of claim 2, wherein defining at least one attribute of the at least one resource includes defining at least one electronic mail attribute of the at least one electronic mail application, and wherein recording the real-time status and the historical status of the at least one attribute of the at least one resource includes recording a status of the at least one electronic mail attribute of the at least one electronic mail application.

4. The method of claim 3, wherein recording the status of the at least one electronic mail attribute of the at least one electronic mail application includes recording at least one of a status of a communication link of the at least one electronic mail application, a transfer rate of the at least one electronic mail application, and a delivery success rate of the at least one electronic mail application.

5. The method of claim 1, wherein identifying at least one resource for performing each of the document distribution services includes identifying at least one print service provider which provides the publishing services.

6. The method of claim 5, wherein defining at least one attribute of the at least one resource includes defining at least one print service provider attribute of the at least one print service provider, and wherein recording the real-time status and the historical status of the at least one attribute of the at least one resource includes recording a status of the at least one print service provider attribute of the at least one print service provider.

7. The method of claim 6, wherein recording the status of the at least one print service provider attribute of the at least one print service provider includes recording at least one of a consumables inventory of the at least one print service provider and a lead time of the at least one print service provider.

8. The method of claim 1, further comprising:
generating an availability report of the document distribution services, including compiling the real-time status and the historical status of the at least one attribute of the at least one resource for each of the document distribution services.

9. The method of claim 8, further comprising:
distributing the availability report of the document distribution services to a system administrator.

10. A computer-readable medium having computer-executable instructions for performing a method of managing document distribution services, the method comprising:
registering document distribution services of a plurality of document distribution providers, the document distribution services including print services, electronic mail services, and publishing services;

identifying at least one resource of the document distribution providers for performing each of the document distribution services, including defining at least one attribute of the at least one resource;

distributing documents with the document distribution services, including receiving and processing document distribution requests each specifying at least one of the document distribution services; and monitoring an availability of the at least one resource for each of the document distribution services, including recording a real-time status and a historical status of the at least one attribute of the at least one resource, wherein identifying the at least one resource includes identifying at least one printer which provides the print services, wherein defining the at least one attribute includes defining at least one printer attribute of the at least one printer, and wherein recording the real-time status and the historical status includes recording at least one of a quantity level of print medium, a status of a print media path, a quantity level of marking material, and a status of an input/output connection of the at least one printer.

11. A system, comprising:

a document distribution system controller configured to have document distribution services of a plurality of document distribution providers registered therewith, the document distribution services including print services, electronic mail services, and publishing services; and an availability analysis system associated with the document distribution system controller and adapted to monitor an availability of the document distribution services, wherein the document distribution system controller is adapted to receive and process document distribution requests each specifying at least one of the document distribution services, and the document distribution services are adapted to distribute documents based on the requests, and wherein the availability analysis system is adapted to record a real-time status and a historical status of at least one attribute of at least one resource of the document distribution providers for each of the document distribution services, wherein the availability analysis system is adapted to record a status of at least one printer attribute of at least one printer configured to provide the print services, including at least one of a quantity level of print medium, a status of a print media path, a quantity level of marking material, and a status of an input/output connection of the at least one printer.

12. The system of claim 11, wherein the availability analysis system is adapted to record a status of at least one electronic mail attribute of at least one electronic mail application configured to provide the electronic mail services.

13. The system of claim 12, wherein the availability analysis system is adapted to record at least one of a status of a communication link of the at least one electronic mail application, a transfer rate of the at least one electronic mail application, and a delivery success rate of the at least one electronic mail application.

14. The system of claim 11, wherein the availability analysis system is adapted to record a status of at least one print service provider attribute of at least one print service provider configured to provide the publishing services.

15. The system of claim 14, wherein the availability analysis system is adapted to record at least one of a consumables inventory of the at least one print service provider and a lead time of the at least one print service provider.

16. The system of claim 11, wherein the availability analysis system is adapted to compile the real-time status and the historical status of the at least one attribute of the at least one resource for each of the document distribution services and generate an availability report of the document distribution services.

17. The system of claim 16, wherein the availability analysis system is adapted to distribute the availability report of the document distribution services to a system administrator.

18. The system of claim 17, further comprising:

a communication network configured to link the document distribution system controller and the system administrator, wherein the availability analysis system is adapted to distribute the availability report of the document distribution services to the system administrator via the document distribution system controller and the communication network.

* * * * *

UNITED STATES PATENT AND TRADEMARK OFFICE
CERTIFICATE OF CORRECTION

PATENT NO. : 6,988,086 B2  Page 1 of 1
APPLICATION NO. : 09/888659
DATED : January 17, 2006
INVENTOR(S) : Barry D. Kurtz et al.

It is certified that error appears in the above-identified patent and that said Letters Patent is hereby corrected as shown below:

In column 13, line 57, in Claim 1, after "method" insert -- , --.

Signed and Sealed this

Eleventh Day of August, 2009

David J. Kappos
*Director of the United States Patent and Trademark Office*